US011829839B2

(12) United States Patent
St. Regis

(10) Patent No.: US 11,829,839 B2
(45) Date of Patent: Nov. 28, 2023

(54) GEAR TRAIN DESIGN ENABLING MECHANICAL ACCELEROMETERS AND LATCHES

(71) Applicant: Carlo St. Regis, Gaithersburg, MD (US)

(72) Inventor: Carlo St. Regis, Gaithersburg, MD (US)

( * ) Notice: Subject to any disclaimer, the term of this patent is extended or adjusted under 35 U.S.C. 154(b) by 1047 days.

(21) Appl. No.: 16/686,098

(22) Filed: Nov. 16, 2019

(65) Prior Publication Data

US 2021/0150304 A1    May 20, 2021

(51) Int. Cl.
| | |
|---|---|
| *G06M 1/08* | (2006.01) |
| *G06M 1/24* | (2006.01) |
| *G01D 5/02* | (2006.01) |
| *F16H 19/04* | (2006.01) |
| *G01P 15/02* | (2013.01) |
| *B65D 41/04* | (2006.01) |
| *B65D 55/02* | (2006.01) |
| *B65D 21/04* | (2006.01) |
| *B65D 41/08* | (2006.01) |

(52) U.S. Cl.
CPC ........... *G06M 1/083* (2013.01); *B65D 21/043* (2013.01); *B65D 41/04* (2013.01); *B65D 41/08* (2013.01); *B65D 55/02* (2013.01); *F16H 19/04* (2013.01); *G01D 5/02* (2013.01); *G01P 15/02* (2013.01); *G06M 1/241* (2013.01)

(58) Field of Classification Search
None
See application file for complete search history.

(56) References Cited

U.S. PATENT DOCUMENTS

| | | | | |
|---|---|---|---|---|
| 1,417,048 | A * | 5/1922 | Farmer, Jr. | G01P 1/08 74/339 |
| 3,013,524 | A * | 12/1961 | York | G01P 15/036 73/11.01 |
| 3,835,809 | A * | 9/1974 | Sinn, Jr. | G01P 15/02 116/203 |
| 4,989,334 | A * | 2/1991 | DuBose, Jr. | G01C 9/00 D10/64 |
| 5,031,803 | A * | 7/1991 | Chen | A63F 9/001 446/73 |
| 5,718,355 | A * | 2/1998 | Garby | G06M 1/083 116/318 |
| 5,984,122 | A * | 11/1999 | Barker | G06M 1/248 215/277 |
| 6,419,384 | B1 * | 7/2002 | Lewis | A01K 7/00 362/802 |
| 7,926,194 | B2 * | 4/2011 | Katoh | H01H 35/14 33/366.11 |
| 8,671,582 | B2 * | 3/2014 | Branch | B65D 79/02 33/391 |
| 10,000,327 | B2 * | 6/2018 | Sumitomo | B65D 81/056 |

FOREIGN PATENT DOCUMENTS

| | | | | |
|---|---|---|---|---|
| FR | 2854878 A1 * | 11/2004 | | A61M 15/0066 |
| WO | WO-2015006292 A1 * | 1/2015 | | A61M 15/0073 |
| WO | WO-2018211339 A1 * | 11/2018 | | A47G 23/16 |

* cited by examiner

Primary Examiner — Christopher W Fulton

(57) ABSTRACT

The invention describes a novel method of transducing a force input into a perpendicularly directed advance of a geared component. This simple mechanism allows for the implementation of latches, accelerometers, tilt sensors, and counters that are uniquely inexpensive, robust, compact, and easy to implement, since they are able to rely on purely mechanical operation.

8 Claims, 6 Drawing Sheets

Figure 5:
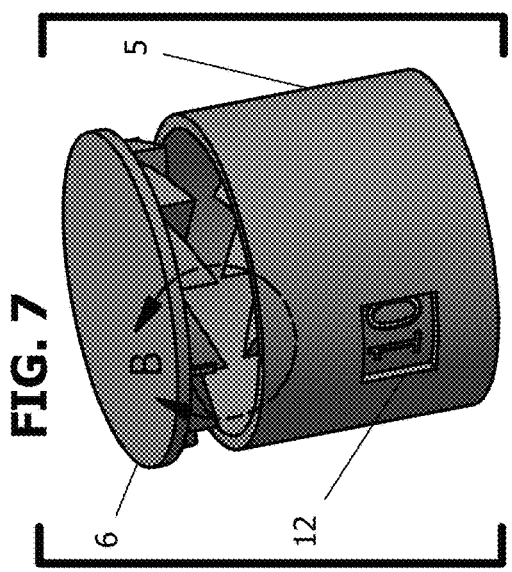

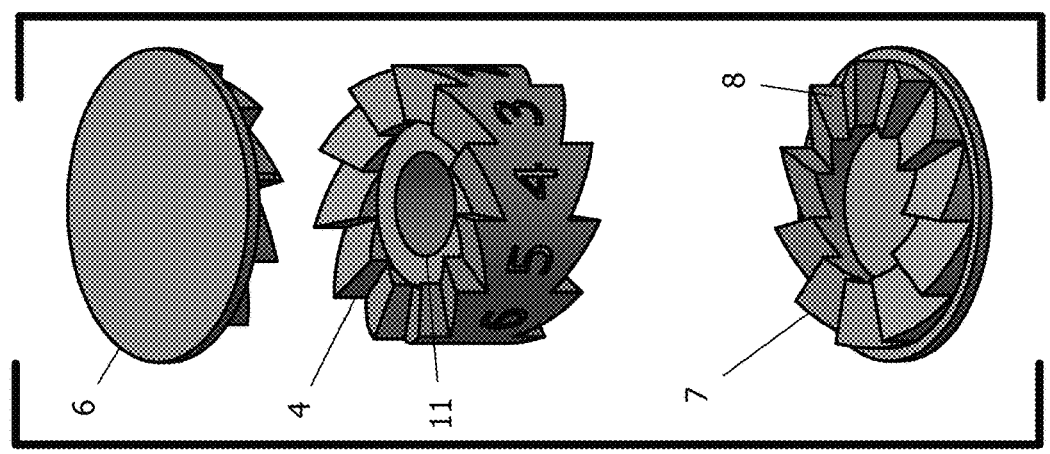
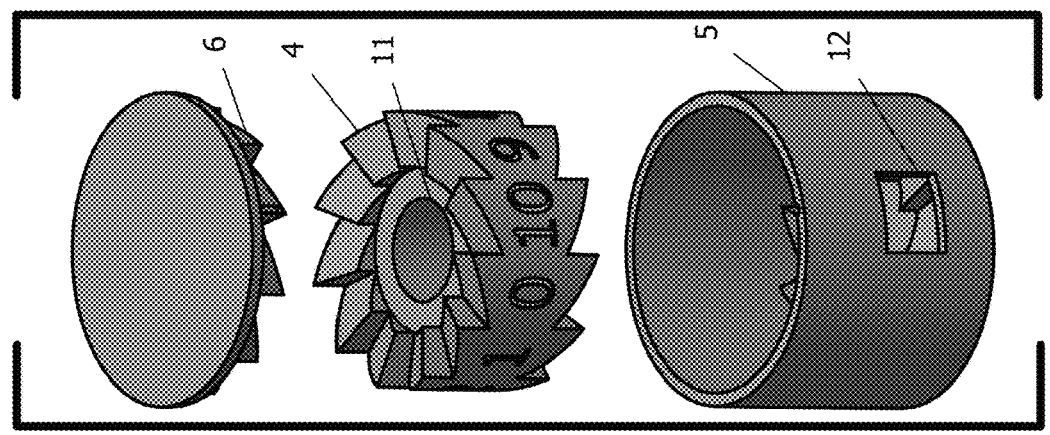
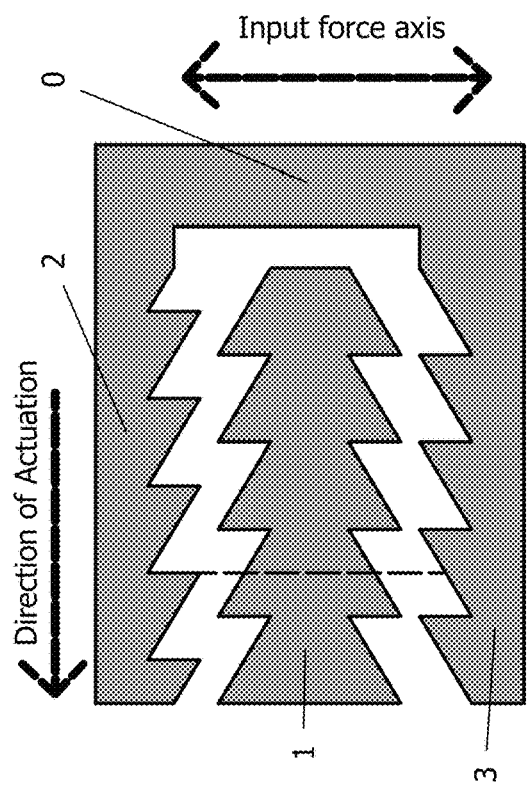
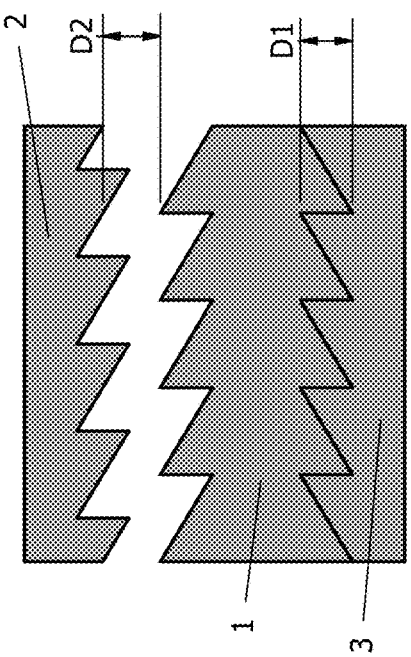

SECTION A-A

DETAIL B

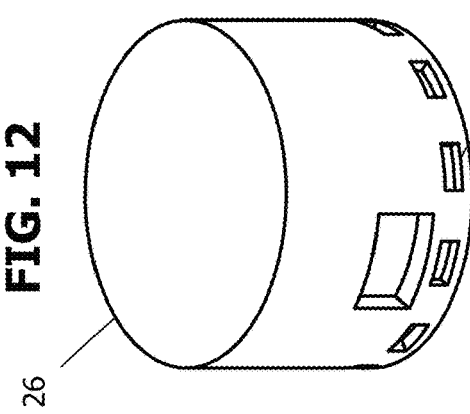
FIG. 10
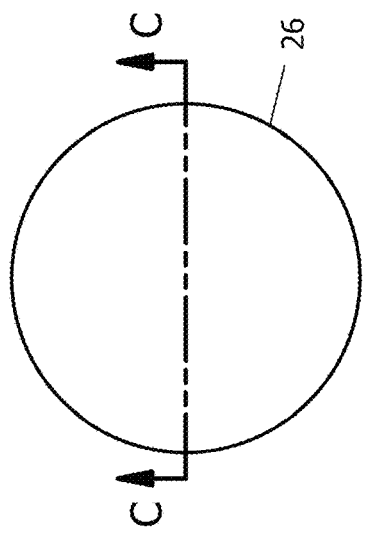
FIG. 11 SECTION C-C
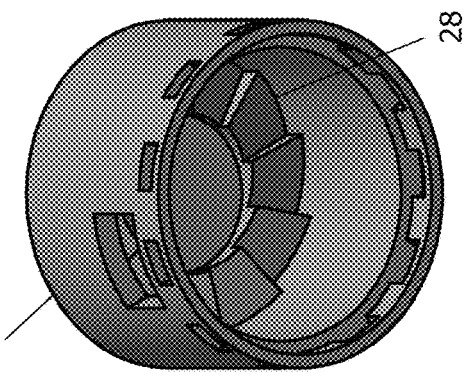
FIG. 12
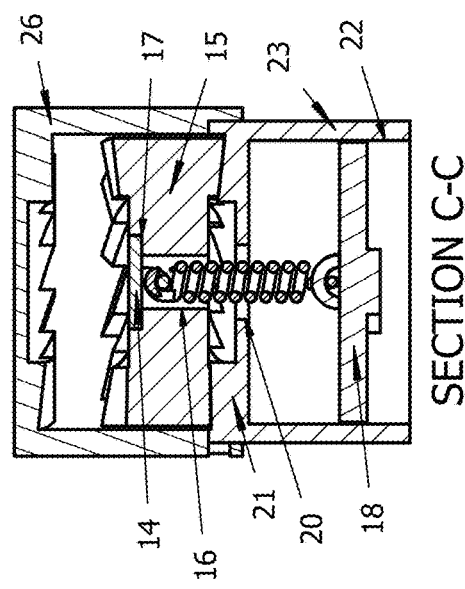
FIG. 13
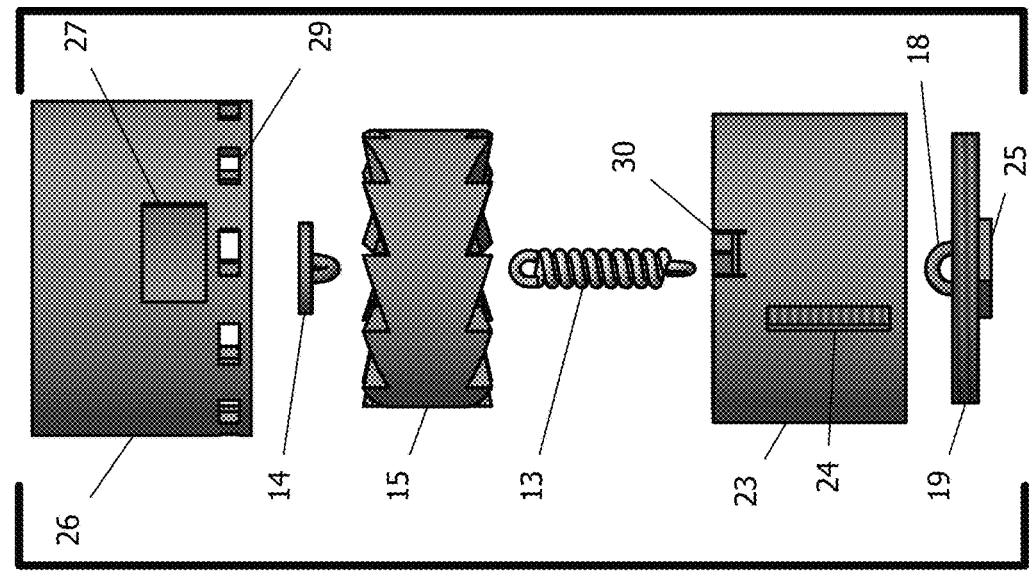
FIG. 9

DETAIL E

SECTION F-F

GEAR TRAIN DESIGN ENABLING MECHANICAL ACCELEROMETERS AND LATCHES

BACKGROUND

U.S. Pat. No. 6,419,384B1 describes a drinking vessel that incorporates an electromechanical inertial switch and an LED or speaker to function as an indicator WO2018211339A1 describes a drinking vessel that incorporates a mechanical tilt indicator that relies on a fluid medium U.S. Pat. No. 5,031,803A describes a drinking vessel with an external ring bearing indices which can be manually rotated U.S. Pat. No. 3,835,809A describes a mechanical shock indicator using an inertial mass that can unseat a pinned connection which otherwise prevents rotation of an indicator disc compelled by a torsional spring U.S. Pat. No. 3,013,524A describes a mechanical shock indicator wherein an inertial mass can be displaced from a cavity when the support force applied by a spring becomes insufficient to counter the force of gravity U.S. Pat. No. 1,417,048A demonstrates the use of indices on the circumferential surface of a bevel type gear An abundance of accelerometers and tilt sensors currently exists, including electromechanical designs that are low cost and extremely compact. However, applications remain for which a simpler mechanism that does not require any circuitry or logic controllers is more optimal. Examples include sensing and indicating inversion of a drinking vessel or medication container, sensing and indicating shock experienced by a package during transit, sensing and indicating tilt of an object such as a lid for the purpose of tamper indication, and providing a simple counting mechanism. The disclosed invention is capable of executing these functions by responding to multiple physical phenomenon, including acceleration, tilt, and submersion, and of providing an indication when the device is subjected to a pre-defined magnitude of such phenomenon, based on the configuration options of the fundamental mechanism. In its basic embodiment, whose uses will be illustrated, the device is purely mechanical, consists of 3 separate parts, includes only 1 moving part, and can be manufactured and assembled at a very low cost. Because of its simplicity it can also be implemented by users with great ease.

SUMMARY

The mechanism on which the device is predicated is a set of gears that is capable of transducing translational kinetic energy into a perpendicular advancement of one of the gears. The Embodiment 1 in FIGS. 1 & 2 demonstrates the fundamental design of the gear train, with both the input and output motions directed in the same plane. The gear train comprises 4 sets of rack type gear teeth. A central, geared inertial mass element (1) features one set of teeth on either side, and is compelled against a grounded, geared stopper on both sides (2, 3). The interlocking geometry of the gear interfaces imparts supporting forces to induce motion of the central gear (1) in a direction henceforth referred to as the direction of actuation, which is labelled on FIG. 1.

An offset is designed in the gear train, so that the central gear is induced to translate incrementally in the direction of actuation. A constant offset creates a two-part translation when the central gear is oscillated between the stopper gears.

Embodiment 1 is useful in visualizing the gear train design, and can serve the unique function of a lock. The central gear can act as a deadbolt type latch, thrown into (or out of) a locked position by its induced translation. A shaft can be incorporated into the central gear to help elongate it in the direction of actuation. Thus submersion, inversion, and acceleration-based locks can be created. However, for applications in which the central gear serves as a sensor and indicator, an embodiment wherein this gear design is revolved into a bevel-type gear train is generally better suited, due to its compact envelope and reciprocating ability.

The disclosed Embodiments 2, 3, and 4 in FIGS. 3-27 utilize such a bevel-type gear design. Referring to FIG. 4 of Embodiment 2, these embodiments convert the input translational motion of a central, geared inertial mass element (4) into rotational motion of the inertial mass, and comprise 4 sets of bevel type gear teeth. Acting as the central geared element, a disc is fitted with 2 of these teeth sets, with one set of teeth integral to each of its planar faces on opposing sides. This geared disc (4) is housed in a cylinder (5) whose axis is coincident to its own, and is allowed to travel along this axis. At each end of the housing cylinder (5), a bevel type gear acts as a stopper (6, 7). An axial force, such as one imposed by gravity, buoyancy of the geared disc mass, or acceleration of the housing cylinder relative to the geared disc, compels the geared disc against one of the stopper gears.

A constant offset in the gear train induces the geared disc to rotate in an angular direction of actuation when a force urges it against one of the stopper gears with which its teeth interlock. The constant offset creates a two-part rotation when the disc is oscillated between the stopper gears, which makes reciprocating rotation possible. An alternative embodiment will also be described that prevents reciprocation of the geared disc, requiring manual reset.

The simplicity of the device is owed in part to the fact that the indicator mechanism is inherent to the inertial mass itself. Markings, for example symbols or numbers, can be incorporated onto the geared disk, either circumferentially, radially along the planar faces, or both. A fixed viewing window incorporated into the cylinder housing allows the rotation of the geared disc to indicate the occurrence of the physical phenomenon that caused it. This go/no go type binary indication can, for example, alternate between two markings, change from an initial state marking to a final state marking, or increment a counter marking via sequential indices. Thus, the device can indicate the presence of a threshold phenomenon, as well as the number of times it was experienced.

It is conceivable to incorporate capacitive plates or electrical contacts onto the geometry of the rotating disc, thereby converting the rotational movement into an electrical signal. However, little advantage is seen in this. The object of the invention is to provide a cheap, simple, and robust sensing and indicating mechanism that precludes the complexity and usage environment limitations of current electromechanical devices, which have already achieved reductions in size beyond the capability of the disclosed mechanism. The disclosed mechanism is fully passive, and can be easily sealed against particulate and liquid ingress. Relative to purely mechanical sensors of the prior art, it is also highly compact.

DESCRIPTION OF VIEWS

FIG. 1: Elevation view of the in-plane Embodiment 1 used to illustrate the fundamental gear train design. Features the central gear (1) suspended between the two stopper gears (2, 3), and includes annotation lines showing the directions referenced in the text, and others to aid description of the relative position of the gear teeth.

FIG. 2: Elevation view of Embodiment 1, but with the connecting member (0) omitted for clarity, and with dimensions shown which are referenced in the text. Shows the central gear (1) resting on the bottom stopper gear (3).

FIG. 3: Exploded view of the complete assembly of Embodiment 2.

FIG. 4: Exploded view of the assembly of Embodiment 2, with the housing cylinder (5) omitted to show the bottom stopper gear (7).

FIG. 5: Plan view of Embodiment 2, looking down from the top stopper gear (6), with section lines shown. There is a partial section view taken from this view.

Figure 6:
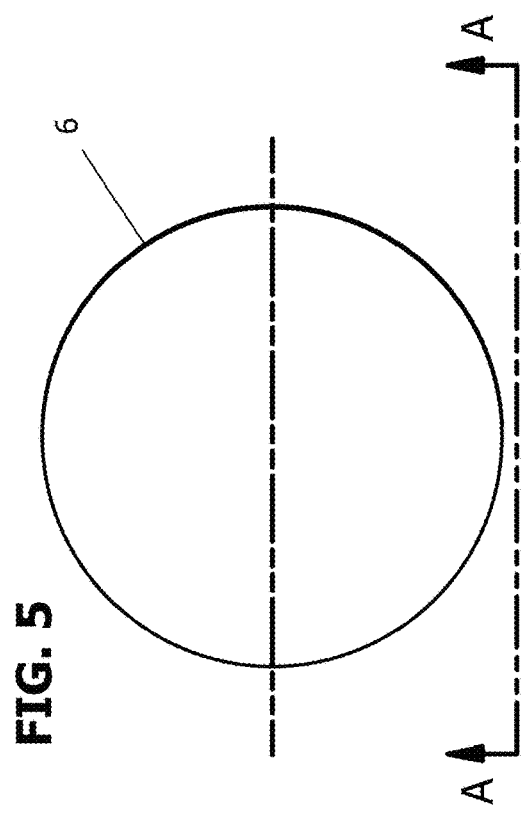

FIG. 6: Partial section view of Embodiment 2 taken from FIG. 5, with the housing cylinder (5) omitted to show the positioning of the gear train.

Figure 7:
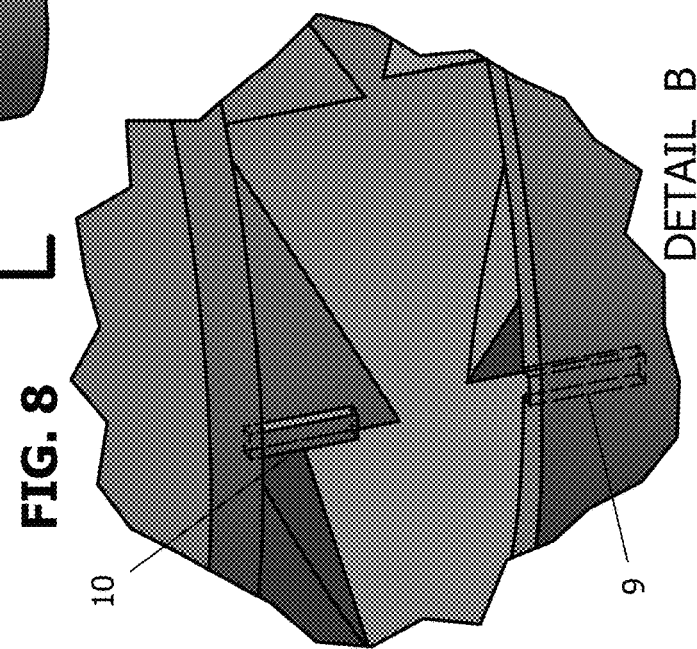

FIG. 7: Perspective view of the full assembly of Embodiment 2, with the top stopper gear (6) only exploded from the assembly. A detail view is taken from this view.

Figure 8:
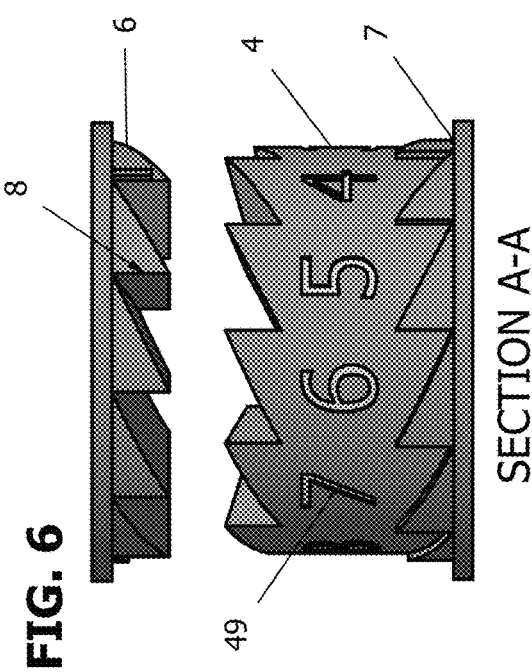

FIG. 8: Detail view of Embodiment 2 taken from FIG. 7, showing the key (10) and keyway (9), with hidden lines shown for these features.

FIG. 9: Exploded view for Embodiment 3, showing the complete assembly.

FIG. 10: Plan view for Embodiment 3. A section view is taken from this view.

FIG. 11: Section view for Embodiment 3, showing the complete assembly.

FIG. 12: Perspective view for Embodiment 3, showing the upper housing (26).

FIG. 13: Perspective view for Embodiment 3, showing the upper housing (26), with its integral stopper gear (28) visible.

Figure 14:
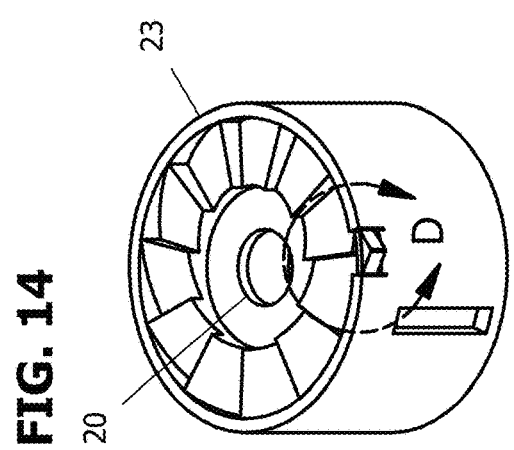

FIG. 14: Perspective view for Embodiment 3, showing the lower housing (23). A detail view is taken from this view.

Figure 15:
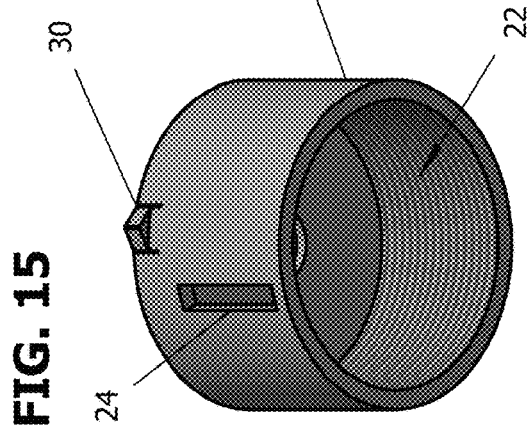

FIG. 15: Perspective view of Embodiment 3, showing the lower housing (23) with its interior threads (22) visible.

Figure 16:
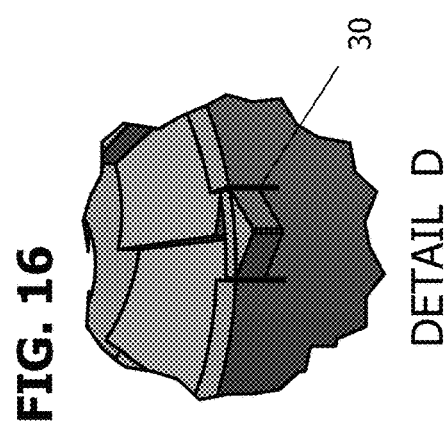
Figure 24:
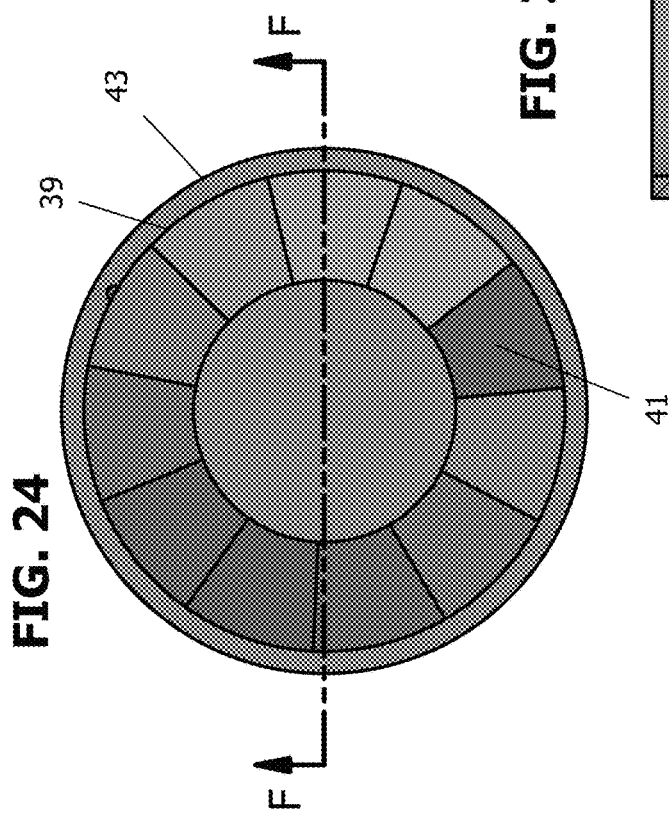

FIG. 16: Detail view of Embodiment 3 taken from FIG. 24, showing the locking tab (30).

Figure 17:
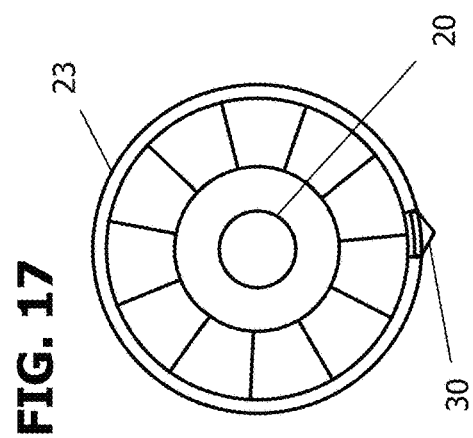

FIG. 17: Plan view of Embodiment 3, showing the lower housing.

Figure 18:
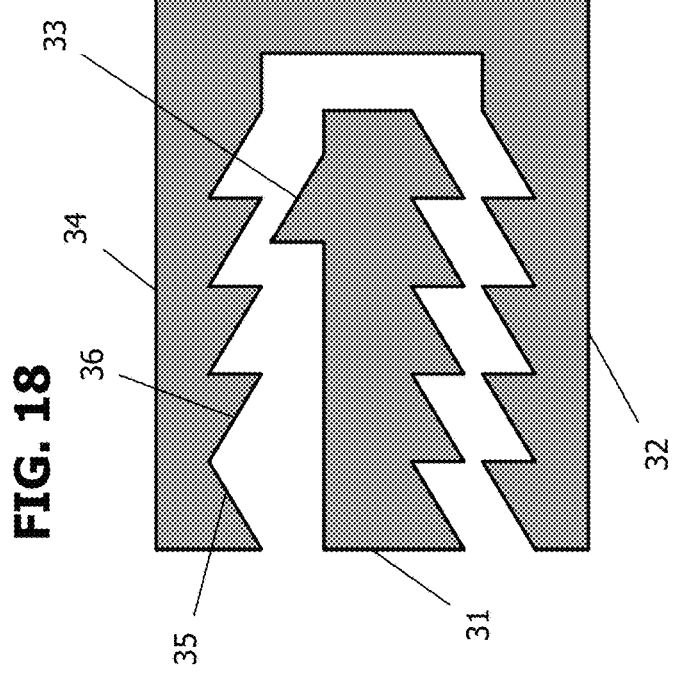

FIG. 18: Elevation view of an in-plane depiction of Embodiment 4, used as a diagram to illustrate the fundamental gear train design.

Figure 19:
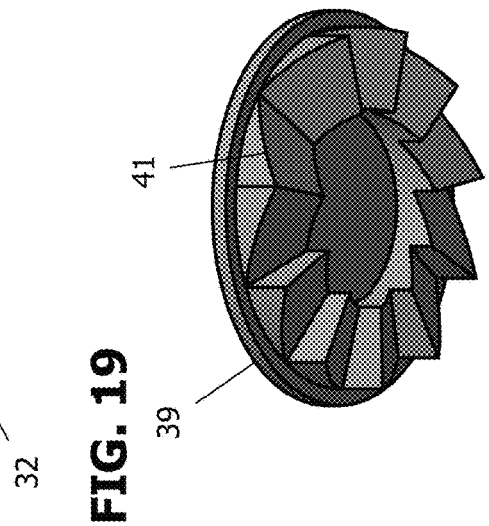

FIG. 19: Perspective view of the terminating stopper gear (39) from Embodiment 4, with the housing cylinder (43) omitted.

Figure 20:
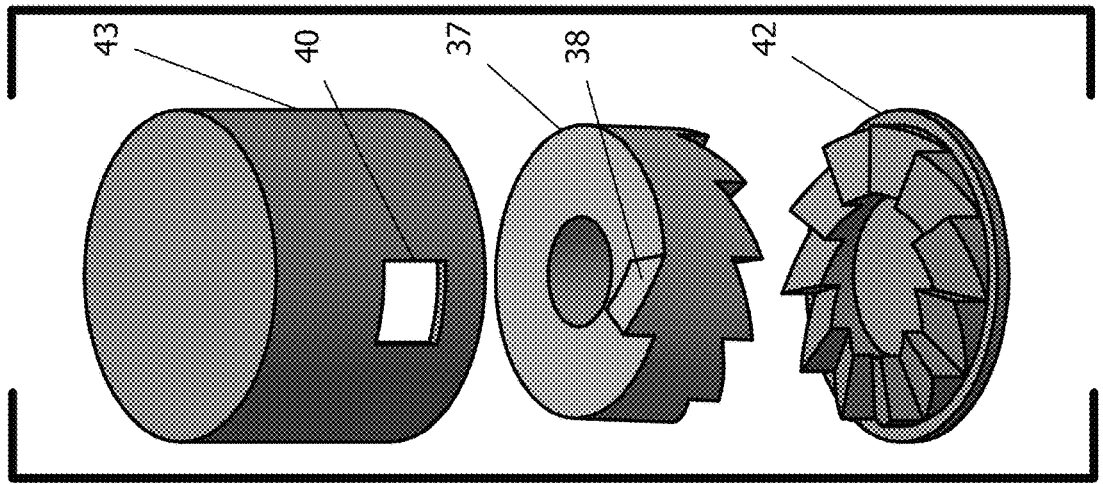

FIG. 20: Exploded view of the complete assembly of Embodiment 4.

Figure 21:
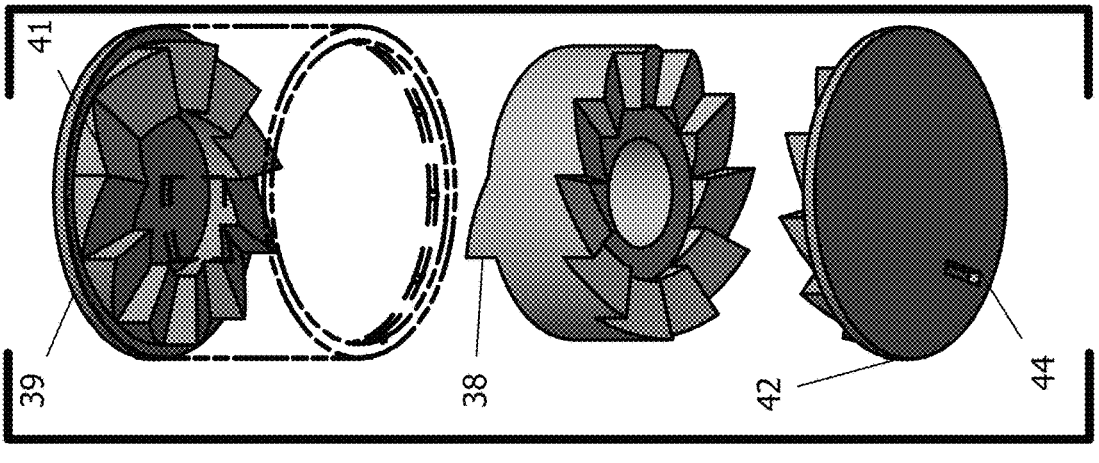

FIG. 21: Exploded view of the assembly of Embodiment 4, with the housing cylinder (43) made transparent to show the terminating stopper gear (39) underneath. Note that the viewing angle is different from that of FIG. 20.

Figure 22:
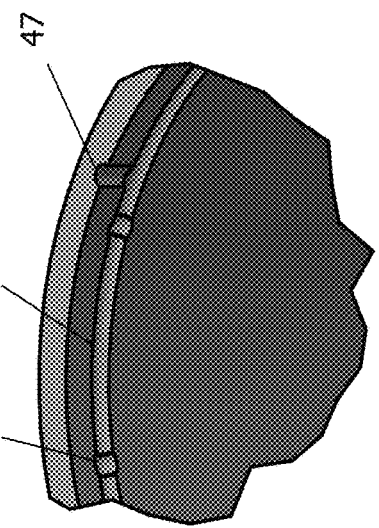

FIG. 22: Perspective view for Embodiment 4 of the housing cylinder (43) and its integral terminating stopper gear (39). A detail view is taken from this view.

Figure 23:
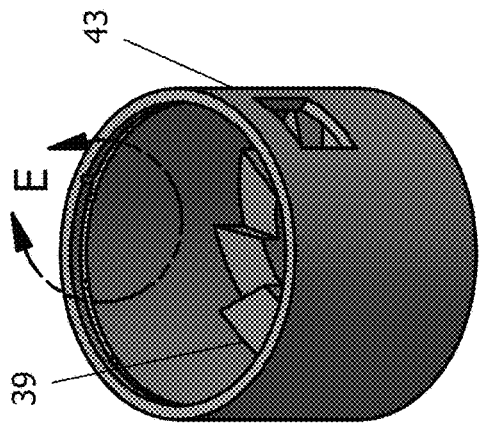

FIG. 23: Detail view for Embodiment 4 taken from FIG. 22, to show the design of the keyway (46, 47) and the spherical enlargements (48).

FIG. 24: Elevation view for Embodiment 4 of the housing cylinder (43) and its integral terminating stopper gear (39). A section view is taken from this view.

Figure 25:
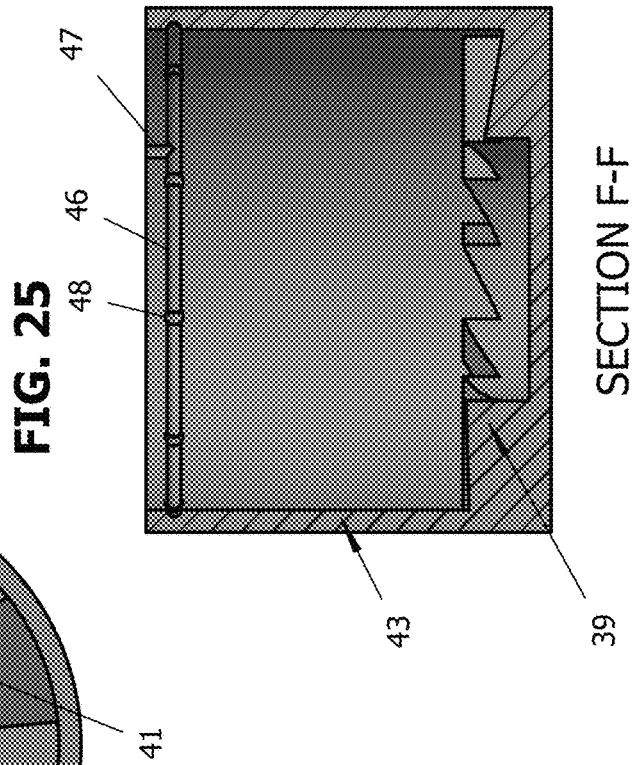

FIG. 25: Section view for Embodiment 4 taken from FIG. 24, depicting the interior of the housing cylinder (43) and its integral terminating stopper gear (39).

Figure 26:
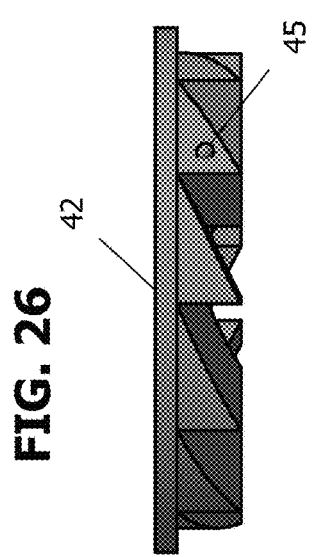

FIG. 26: Elevation view for Embodiment 4 of the non-terminating stopper gear (42), with its inherent detent (45) visible.

Figure 27:
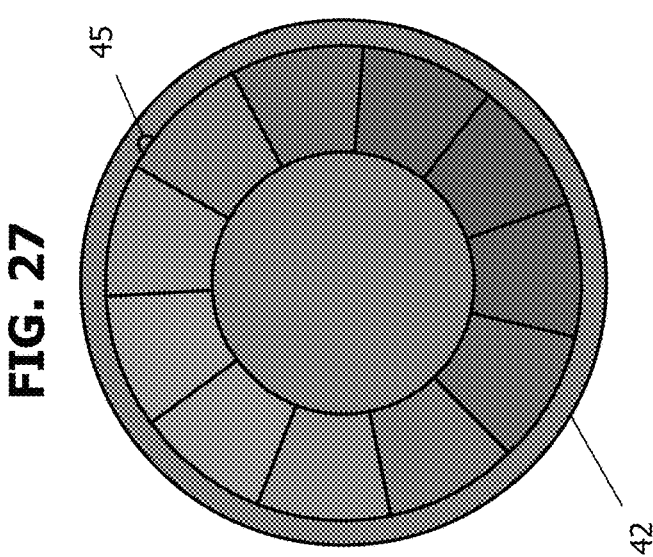

FIG. 27: Plan view for Embodiment 4 of the non-terminating stopper gear (42), with its inherent detent (45) visible.

DETAILED DESCRIPTION

Embodiments 1 & 2

Fundamental Mechanism

Important Design Characteristics

There are several (non-obvious) characteristics of the mechanism derived from the gear train design that have notable implications to functionality, namely: the direction, dimension, and number of the gear teeth; the offset timing of the stopper gears; and the distance disposed between the stopper gears.

For each of these 3 sets of characteristics, the specification will first delineate the pertinent details for the in-plane configuration of Embodiment 1, since this embodiment is more conducive to visualization. For each characteristic set the specification will then describe the analogous characteristics incorporated in the cylindrical Embodiment 2. These characteristics are identically maintained in cylindrical Embodiments 3 and 4, which incorporate additional functionality into the mechanism of Embodiment 2; however, for the sake of simplifying reference numbers used, the specification will not refer to Embodiments 3 and 4 when illustrating said characteristic sets.

Referring to FIGS. 1 & 2 of the in-plane Embodiment 1, in order for both stopper gears (2, 3) to induce central gear motion in the same direction of actuation, the direction in which one stopper gear's teeth are inclined must be opposite the direction in which the other stopper gear's teeth are inclined, when the assembly is viewed as in FIG. 1. The design of the central gear (1) teeth should be such that the top set of central gear teeth interlocks with the top stopper gear (2), and the bottom set of central gear teeth interlocks with the bottom stopper gear (3).

Referring to FIGS. 3-8 of the cylindrical Embodiment 2, in order for both stopper gears (6, 7) to induce geared disc motion in the same direction (either clockwise or counterclockwise), the direction in which one stopper gear's teeth sweep must be opposite the direction in which the other stopper gear's teeth sweep, when the assembly is viewed as in FIG. 6. As a result, the same part cannot be used for the top stopper gear (6) and bottom stopper gear (7), since their teeth must sweep in opposite directions. The design of the geared disc teeth is such that the top set of geared disc teeth interlocks with the top stopper gear, and the bottom set of geared disc teeth interlocks with the bottom stopper gear. The disclosed cylindrical Embodiment 2 depicts a configuration of the mechanism wherein the directional configurations of the gear teeth induce counterclockwise rotation of the geared disc (4) (when viewed from the perspective of FIG. 5), though it is readily apparent how a clockwise rotating configuration could be achieved instead, by flipping the incline directions of all gear teeth.

Referring to FIGS. 1 & 2 of the in-plane Embodiment 1, the dimensions of all the teeth are uniform, and all teeth on all gears are inclined at an angle of the same magnitude. This is preferred for simplicity and compactness.

Referring to the cylindrical Embodiment 2, depicted in FIGS. 3-8, the dimensions of the teeth of the top and bottom stopper gears are uniform. The geared disc (4) teeth are inclined at an angle of the same magnitude as that of the stopper gear teeth inclines, but are slightly shorter than the stopper gear teeth. This is due to the fact that the geared disc must have a clearance fit with the housing cylinder (5), and thus must have an outer diameter smaller than the inner diameter of the cylindrical housing. Since the gear teeth grow in height in the radial direction, the geared disc teeth are thus shortened, and the interfacing teeth sets still interlock without voids, which is preferred.

Referring to FIG. 4, the tooth faces (8) that limit further travel in the direction of actuation are "vertical" in the sense that their surface normal vectors are perpendicular to the cylindrical axis of the assembly. This is preferred to minimize the circumferential size of the teeth and reduce the overall device envelope minimum requirement. The incline angle of the teeth is dependent on the number of teeth, and the height and width of the teeth, which are, to an extent, design parameters driven by the application and the overall device envelope requirements; testing ensures that the tooth angle is well suited to induce rotation of the geared disc and is not too shallow or too steep.

All disclosed embodiments feature the same number of teeth on each stopper gear, and the written description incorporates this assumption. This configuration is preferred for simplicity and standardization of components. The maximum number of recordable events, and the sets of numbers of events that divide evenly into a reciprocating count, are limited by the maximum number of teeth. Thus, the optimal maximum number of teeth is dependent on the application. An arbitrary maximum number of teeth was chosen for the disclosed in-plane and cylindrical embodiments.

For all embodiments, there are additional geometric attributes that would be necessary to fully describe the design of the teeth. The fundamental requirement is that the geometry of the teeth imposes a force on the central gear in the direction of actuation for a finite distance. There are multiple possible shapes that can achieve equivalent functionality. For example, a set of simple spokes could serve as a stopper gear, interfacing with a set of angled teeth on the central gear. This specification does not intend the term "tooth" to limit the indicated structure to an archetypal triangular profile, but rather to encompass all designs that meet the stated functional requirements. Furthermore, a complete revolved set of teeth for every gear is not absolutely necessary, as will be shown in Embodiment 4.

In addition to the tooth geometry, the offset timing of the gear sets is essential to creating incremental motion when the central gear is compelled into a stopper gear.

The optimal offset timing is depicted in FIGS. 1 & 2 of the in-plane Embodiment 1. The object is to introduce a perpetual misalignment of the gear train. This can be achieved by offsetting the timing of the teeth of the stopper gears (2, 3), meaning a line joining the crest of one stopper gear's teeth to the crest of the opposing stopper gear's closest tooth is not perpendicular to the direction of actuation. The central gear (1) is then designed so that its top and bottom teeth sets are NOT offset with respect to each other, in the same sense with respect to the tooth crests.

Conversely, because the offset timing is dictated by the relative positioning of two separate interfaces, alternative designs could also be used with little consequence. In an alternative design which is not shown, the teeth of the stopper gears are fully aligned such that the lines joining their crests are minimized in length and are perpendicular to the direction of actuation. The top and bottom teeth sets of the central gear would then need to be offset with respect to each other, such that the central gear is not symmetrical from top to bottom. For the sake of simplicity and symmetry of the central gear part, the former of the two designs, wherein the stopper gears are offset with respect to each other and the central gear (1) is symmetrical from top to bottom, is preferred and is employed in all disclosed embodiments (though it will be seen that some teeth are removed from one side of the central gear in Embodiment 4).

Referring to FIG. 6 of the cylindrical Embodiment 2, the timing offset is achieved by rotationally offsetting the timing of the teeth of the stopper gears (6, 7) (meaning the line joining the crests of one stopper gear's tooth to the opposing stopper gear's closest tooth, when assembled, is not parallel to the axis of the cylinder), and the geared disc's top and bottom teeth are designed so that they are not rotationally offset relative to each other.

Referring to FIGS. 1 & 2 of the in-plane Embodiment 1, it is preferred to offset the stopper gears in a symmetrical fashion. In other words, a line perpendicular to the direction of actuation that joins a stopper gear tooth crest to the opposing stopper gear should intersect said opposing stopper gear at the midpoint between the crest and valley of the intersected tooth. This line is shown on FIG. 1. In other words, one stopper gear's teeth should be positioned halfway between the other stopper gears teeth, measured in the direction of actuation. Recall that the teeth dimensions are uniform between the two stopper gear tooth sets. This symmetrical offset is preferred because it makes uniform the distance limit that each stopper gear can/must increment the central gear in the direction of actuation. This incremental actuation distance limit, if too small, may not create a sufficient actuation to overcome noise forces and imperfect geometry, which would result in the central gear's teeth not incrementing far enough to enter a new set of teeth of the stopper gear to which it will return. Because the actuation distance limits for each stopper gear are both dependent on the offset timing, it is optimal to equalize the actuation distance limits via the aforementioned symmetrical offset timing, therefore maximizing the minimum actuation distance limit for the assembly.

Referring to the cylindrical Embodiment 2 depicted in FIGS. 3-8, the stopper gears (6, 7) are offset in an analogous preferred symmetrical fashion so that the stopper gears' teeth are halfway between each other. In other words, an axis drawn parallel to the housing cylinder's (5) axis and intersecting the crest of a tooth of one of the stopper gears intersects the opposing stopper gear at a point midway between the opposing stopper gear's teeth crests, when measured along the circumference of the opposing stopper gear. To this end, a keyway (9) in the housing cylinder (5) and corresponding key (10) on the top stopper gear (6) predefine a single assembly position.

Lastly, the distance between the stopper gears is an essential characteristic for the function of the mechanism.

Referring to FIG. 2 of the in-plane Embodiment 1, the central gear (1) must have sufficient room to fully clear one stopper gear before contacting the other; otherwise it will not be able move in the direction of actuation. The trajectory of the central gear (1) must not intersect with the top stopper gear (2) and the bottom stopper gear (3) at the same time, because each stopper gear imposes both an immediate contact force in the direction of actuation at the initial contact points, and a contact force opposing the direction of actuation at the terminal contact points. To visualize the dimensional requirement that achieves this, one should consider the central gear seated against the bottom stopper gear (3) as in FIG. 2. To translate far enough away from the bottom stopper gear (3) so that the bottom stopper gear geometry does not obstruct the central gear from translating in the direction of actuation, the central gear must travel a certain distance (D1) along a trajectory determined by the geometry of the bottom stopper gear (3). In the case of the disclosed embodiments, the trajectory is aligned with the input force axis and is perpendicular to the direction of actuation. As a result, the distance (D1) must be less than the gap (D2) between the central gear, when seated, and the top stopper gear (2), measured along the same trajectory. Because the gear sets interlock completely in the disclosed preferred embodiments, this gap is the same between all contact points, assuming the central gear is seated or is translating purely along said trajectory.

It is generally preferable to minimize the gap between the stopper gears in excess of the D2>D1 requirement. During the time that the central gear has cleared one stopper gear and has yet to contact the other, only its inertia and any friction with the housing resist forces that would induce premature translation along the axis of actuation. Therefore, minimizing this gap minimizes the potential for error caused by forces external to the translational forces which are the object of study.

Referring to the cylindrical Embodiment 2 depicted in FIGS. 3-8, the stopper gear (6, 7) spacing requirement is directly analogous to that for the in-plane embodiment. Measured along the cylinder axis, the gap between the stopper gears must be large enough to allow the geared disc (4) teeth to clear the bottom stopper gear (7) teeth, which prevent rotation in the direction of actuation, before contacting the top stopper gear (6) and being induced to rotate in the direction of actuation (arbitrarily assuming the geared disc is initially resting on the bottom stopper gear). The stopper gear gap in excess of said clearance requirement should also be minimized, to minimize the effect of noise forces on the geared disc; the symmetrical design of the geared disc also mitigates rotational forces caused by moment imbalances from its center of gravity.

Description of Operation

In describing the operation of the fundamental mechanism, the specification will focus on the cylindrical Embodiment 2, as the analogous implications for the in-plane Embodiment 1 are either readily apparent or not applicable.

In the Embodiment 2, the geared disc (4) is biased according to gravity, and rests on the bottom stopper gear (7) when the assembly axis is outside the plane normal to the direction of gravity and the top stopper gear (6) is above the bottom stopper gear relative to the direction of gravity. The device functions as an accelerometer when the housing assembly (5, 7) is accelerated with a vector component along the housing cylinder axis and away from the geared disc. The inertial mass of the geared disc is free to translate relatively along the housing cylinder axis. After translating away from its initial position on the bottom stopper gear (7), it strikes the opposing top stopper gear (6) and, in the continued presence of sufficient axial force, the incline planes of the interlocking gear teeth impart a support force on the geared disc that induces rotation of the geared disc. The disc rotates relative to the rest of the housing assembly which includes the stopper gears, and the crests of its bottom teeth travel beyond the openings of the tooth recesses in which they had previously been resting on the bottom stopper gear. The interlocking tooth pattern of the top stopper gear prevents the geared disc from incrementing further than one tooth location. When a restorative force of gravity or another acceleration induces the geared disc to translate back towards the now offset bottom stopper gear, it contacts the interlocking teeth and is again induced to rotate until the crests of its bottom teeth rest in the valleys of the bottom stopper gear, completing the two-part rotation. Having shifted over one bottom stopper gear tooth, due to the constant offset of the top and bottom stopper gears, the geared disc is primed to repeat the movement indefinitely.

The weight of the geared disc and the housing assembly, the sizing of the gear teeth, the friction coefficients at the gear interfaces and the interfaces of the geared disc and the housing, and the moment of inertia of the geared disc determine the set value of acceleration that is sufficient to cause the geared disc to increment. The geared disc includes a central cylindrical void (11) that reduces the weight and material requirement, and allows air to easily displace inside the housing cavity as the geared disc translates.

A rotation is induced in the same manner when the force results from varying the angle of the assembly axis with respect to the direction of gravity. When the axis of the device is tilted sufficiently beyond a 90° angle such that the friction between the geared disc and the housing wall is overcome, the disc translates to contact the opposing stopper gear. When the tilt angle is restored back below this threshold, the geared disc translates again and is induced to complete the incremental rotation.

An example of the utility of this embodiment is its incorporation into a drinking glass. Mounted on the bottom of a glass, the device will indicate an incremented number in the viewing window (12) each time the user tilts the glass far enough to empty its contents (without sucking the liquid) and returns it to an upright position. To reset the counter, the user can quickly shake the glass the necessary amount of times until the counter returns to 0, adding to the novelty of the product. Alternative reset means are mentioned in additional embodiments. Similarly, the device could be mounted to a pill bottle, pet food container, or other object for which periodic use involving a simple tilting motion is required. A geared disc marked with days of the week, for example, can be used to indicate the most recent use. The device could also be mounted on a tilt-able latch such as a laptop screen, or to an object for which inversion would indicate tamper.

If sufficient openings, such as the cutout for the viewing window, are provided in the housing to allow the ingress of liquid while still constraining the geared disc's movement, the device can indicate the occurrence of submersion. The buoyancy force will raise the geared disc up to contact the stopper gear, and gravity will return the geared disc to the opposing stopper gear once the device is removed from the liquid, completing the rotation.

Regarding assembly of Embodiment 2, the top stopper gear (6) can be joined, for example, to the housing cylinder (5) with adhesive and/or an interference fit.

Embodiment 3

Restoring Force

To limit the influence of gravity, and/or remove the need for two-part force application to return the geared disc to its resting position, an internal restoring force can be provided by a spring. This is the purpose of Embodiment 3, depicted in FIGS. 9-17. With this embodiment, successive accelerations in the same direction can be recorded. Furthermore, by modifying the static displacement of the spring, the threshold acceleration value that triggers the mechanism to actuate can be adjusted. An example of the use of such an embodiment is a handheld counter, which is incremented when shaken. Such a counter could be used to help count repetitive exercises, via deliberate triggering or integration into the natural motion of the exercise. When integrated into the exercise, the device's acceleration threshold could be adjusted and used to validate whether the movement was sufficiently rapid, automatically tracking explosive movement from the user. Establishing a repeatable, quantity-based threshold is especially useful to ensure the user is not "going through the motions" when performing exercises which are intended to produce explosive movements, and allows this type of performance to be tracked. Yet another application is monitoring shock on packages during shipment. The device could be placed along the axis where shock is most likely and/or most critical, or an array of six devices, two for each direction of each axis, could be used to monitor shock in all possible directions.

Referring to FIGS. 9 & 11, the disclosed design which incorporates said adjustable spring can be described as follows. The spring (13) at one end is anchored to the disc plug (14), which is shaped to receive the spring through a loop. The geared disc (15) has a hollow cylindrical center shaft (16), through which the spring extends. The disc plug (14) has an outer diameter larger than the geared disc's center shaft (16). A cavity (17) on the planar face of the geared disc with an inner diameter slightly larger than the disc plug receives the disc plug, in order to constrain the disc plug circumferentially. The disc plug transfers the linear spring force to the geared disc (15), but the geared disc is still able to rotate about the disc plug, limited by the spring force and by the friction at the interface of the geared disc cavity (17) and the disc plug (14). Accordingly, it is optimal to minimize the friction at the interface between the disc plug and the geared disc. At the spring's opposite anchor point, a loop (18) in the tension adjustment disc (19) receives the spring. The spring passes through another shaft (20) created by an opening in the bottom stopper gear (21).

The tension adjustment disc (19) is threaded to interface with the internal threads (22) of the lower housing (23). Rotating the tension adjustment disc causes it to translate along the axis of the lower housing, and alters the static displacement of the spring. A viewing window (24) allows for monitoring of the location of the tension adjustment disc, and the lower housing can be provided with measurement lines and indices (not shown) along the spring tension viewing window (24). The indices can comprise a relative proportional scale, or the acceleration or force threshold values required to actuate the geared disc at that displacement setting. These values are primarily dependent on the spring characteristics and can be determined or verified empirically by subjecting the assembly to known accelerations. The tension adjustment disc includes a protruding bar (25) to aid in hand turning, which includes a recess (not shown) to receive a flathead screwdriver.

The upper housing (26) incorporates the viewing window (27) and the top stopper gear (28), and features cutouts (29) to join the upper housing to the lower housing (23) via a locking tab (30). The incremental inclusion of the cutouts (29) along the full circumference of the upper housing allows the upper housing (26) and the viewing window (27) to be rotated relative to the lower housing (23), the bottom stopper gear (21), and the geared disc (15). Because this creates a relative rotation between the viewing window and the geared disc, it allows the user to reset the index displayed in the window to any of the available values without having to actuate the geared disc. The relative locations of each of the upper housing cutouts (29) and the locking tab (30) ensure that the top and bottom stopper gears are rotationally offset correctly as described in section 9.1.1. Note that this manual reset functionality is independent of the restoring-force configuration, but was included in the same embodiment in order to reduce the number of views necessary and illustrate the ability to combine distinct features in a single assembly.

Regarding assembly of Embodiment 3, the spring (13) is attached to the tension adjustment disc (19), then inserted through the shaft (20) in the bottom stopper gear (21). The tension adjustment disc is then threaded into the lower housing (23). To prevent user removal of the tension adjustment disc, the thread interface close to the open end of the lower housing can be obstructed, such as through welding of filler material, adhesive, or marring the threads. A lid (not shown) can also be threaded into the lower housing after insertion/adjustment of the tension adjustment disc, to prevent matter ingress. The remaining components are intuitively assembled.

Embodiment 4

Non-Reciprocating Gear Train

In some cases, such as when trying to detect tamper or shock, or when counting a phenomenon without checking the indicated count frequently or knowing the maximum expected count, a reciprocating counting mechanism is not desirable. In order to provide for an interruption of further geared disc rotation when a maximum actuation value is reached, Embodiment 4 introduces a modified tooth design. The fundamental gear train design is illustrated in FIG. 18, which is an in-plane diagram of the tooth design that is incorporated into bevel-type gears in Embodiment 4.

Referring to FIG. 18, the interface between the central gear (31) and the non-terminating stopper gear (32) is unchanged from Embodiment 1 (depicted in FIGS. 1 & 2). The terminating side of the central gear features only a single tooth (33), whose dimensions are not necessarily changed from the teeth of Embodiment 1. The terminating stopper gear (34), interfacing with the single-toothed side of the central gear, features one tooth (35) inclined in a direction opposite of its other teeth, referred to as the terminal tooth (35). The terminal tooth provides a support force that obstructs the incremental translation of the central gear in the direction of actuation. When the central gear translates away from the non-terminating stopper gear (32) and the single tooth (33) is compelled into the terminal tooth, the only perpendicular translation induced opposes the direction of actuation, and is limited by the terminating stopper gear tooth adjacent (36) to the terminal tooth. As a result, the central gear, when re-introduced to the non-terminating stopper gear (32), re-seats into the same position from which it had departed. This results in an indefinite prevention of further central gear perpendicular translation. When the single tooth contacts any tooth other than the terminal tooth, translation in the direction of actuation occurs as in Embodiment 1. As a result, the location of a terminal tooth (35) can provide a terminal position for the central gear, relative to the terminating stopper gear (34).

It is therefore necessary to re-position the central gear (31) relative to the terminating stopper gear (34) when one desires to reset the mechanism and allow another full or partial cycle of central gear motion. For an in-plane embodiment of the mechanism as in FIG. 18, the rack type central gear (31) need only be pushed/pulled so that it can slide along the non-terminating stopper gear (34). However, this requires that the gap between the stopper gears be sufficient to provide clearance for the central gear teeth. To this end, the analogous dimension D2 from FIG. 2 must be greater than the analogous dimension D1 from FIG. 2. Otherwise, the central gear would need to be removed in a direction perpendicular to the plane in which the central gear moves during operation.

Referring to the cylindrical design of Embodiment 4 depicted in FIGS. 19-27, it is similarly necessary to reposition the geared disc (37) and its integral single tooth (38) relative to the terminating stopper gear (39), if one desires to allow another cycle of motion. Because Embodiment 4 also depends upon a viewing window (40) to provide an indicator value of the geared disc, the relative position of the viewing window to the geared disc ALSO needs to be reset. Accordingly, the viewing window is grounded to the terminal tooth (41). As a result, the same central gear indicator value will always be shown when the terminal interface occurs; this is the terminal value, e.g. a maximum index count.

The disclosed optimal method for executing this reset function is to allow the geared disc to rest on the non-terminating stopper gear (42). The non-terminating stopper gear and the geared disc can then be rotated together, relative to the housing cylinder (43), to which the terminating stopper gear (39) and the viewing window (40) are both integral. The user can grasp the circumferential edge of the non-terminating stopper gear to rotate it with the geared disc, and they will be able to see the indicator value change in the viewing window as they alter the gear train positioning. A recess (44) is also disposed in the non-terminating stopper gear to receive a fingernail or screwdriver to facilitate turning.

Although rotating the non-terminating stopper gear (42) and geared disc (37) together modifies the location of the geared disc's single tooth (38) relative to the terminal tooth (41), it can also compromise the optimal stopper gear rotational offset previously described. A revolute joint that biases discrete positions corresponding to the optimal stopper gear offset at each possible location setting is therefore optimal at the interface of the non-terminating stopper gear (42) and the housing cylinder (43). The disclosed embodiments provide two basic options: a ball-and-socket keyway, and a locking tab.

The ball-and-socket keyway is shown in Embodiment 4. A ball detent (45) on the non-terminating stopper gear travels inside the keyway (46). The keyway allows rotation of the non-terminating stopper gear (42) while constraining the non-terminating stopper gear inside the housing cylinder (43). An entry keyway (47) aids assembly and disassembly. At each incremental location on the keyway that provides the optimal stopper gear offset, a spherical enlargement (48) in the keyway creates a force-biased position of the non-terminating stopper gear detent (45). In order to function correctly, compliance must exist in the interface between the stopper gear detent and the keyway, so that the geometry of the keyway exerts a constraining force on the detent to resist unwanted rotation or separation of the non-terminating stopper gear from the housing cylinder, and so that the incremental keyway enlargements (48) can provide a reduction in the compressive radial force on the non-terminating stopper gear. To this end, in the disclosed Embodiment 4, the housing cylinder should be made of a material possessing suitable elasticity, so that an interference fit with the non-terminating stopper gear will provide constraining force but not prevent rotation with a reasonable amount of force input. Alternatively, a ball detent that is spring-loaded or inherently compliant can be implemented, depending on the degree of robustness and cost-savings desired.

The locking tab design is incorporated in the previously described Embodiment 3. Note that the gear train for Embodiment 3 does not incorporate a terminal interface, and is thus a reciprocating type gear train. However, the locking tab joint allows the user to adjust the indicated value at any time, without having to actuate the geared disc. Therefore, a revolute joint with biased positions has utility for both non-reciprocating and reciprocating embodiments. For non-reciprocating embodiments, a manual reset means is of course a necessity.

The locking tab design is arguably more robust in terms of mechanical wear and locking force, and provides a clearer indication when the detent mechanism is properly seated. The ball-and-socket design neatly hides the detent mechanism on the interior of the housing, and may provide greater ease-of-use if the dimensions and materials are properly refined. The optimal design depends on the application.

For either design, the viewing window provides a supplemental method to ensure proper stopper gear offset alignment, since the rotational alignment of the geared disc is observed through the viewing window. As long as the geared disc (37) is seated on the non-terminating stopper gear (42), the geared disc also indicates the rotational alignment of the non-terminating stopper gear. To take advantage of this fact, an alignment indicator such as a border can be included around the index on the geared disc. As long as the border is properly framed in the viewing window, the index is centered, and the stopper gears are properly offset. This of course requires that the geared disc indicating features are designed so that they are centered in the viewing window when the geared disc is seated on the non-terminating stopper gear and the non-terminating stopper gear is properly rotationally offset from the terminating stopper gear. Referring to FIGS. 20 & 21 of Embodiment 4, note that the viewing window (40) should be sized and positioned so that the user can observe the geared disc index when the geared disc is seated on the non-terminating stopper gear (42)—as opposed to only when the geared disc is seated on the terminating stopper gear (39).

Referring to FIGS. 18-27 of Embodiment 4, it is important to note that, when employing the disclosed reset method of rotating the geared disc (37) together with the non-terminating stopper gear (42), incorporating one biased rotational position of the non-terminating stopper gear (42) relative to the terminating stopper gear (39), for each tooth on the terminating stopper gear (39) is necessary. This is due to the reset-imposed relative rotation between the non-terminating stopper gear and the housing cylinder (43) to which the terminating stopper gear (39) is grounded.

To elaborate, consider that the geared disc (37) is seated in the non-terminating stopper gear (42), at an initial position such that the geared disc's single tooth (38) is the maximum number of teeth away from the terminal tooth (41), measured in the direction of actuation. This allows the maximum amount of incremental rotations (and therefore incremental indices) of the geared disc before reaching the terminal interface (for an assembly possessing a given number of teeth on each stopper gear). After cycling through the incremental rotations, the geared disc reaches the terminal interface, and is prevented from reciprocating. The geared disc is now one stopper gear tooth away from its initial position where the cycle began, measured in the direction of actuation. To allow renewed rotation at the beginning of the cycle, the non-terminating stopper gear (42) and geared disc (37) are rotated together, by an amount encompassing one stopper gear tooth. The geared disc is effectively "jumped" past the terminal tooth (41), and returned to the position where its cycle began, relative to the terminating stopper gear (39). The non-terminating stopper gear (42), however, has rotated one radial tooth relative to the terminating stopper gear (39). When the geared disc completes another cycle and the reset occurs again, the non-terminating stopper gear (42) will once more rotate on radial tooth relative to the terminating stopper gear (39), in the same direction each time (since the geared disc is only rotating in the direction of actuation). Thus, since the alignment between the stopper gears is shifted by one tooth each time the geared disc and non-terminating stopper gear are reset, a biased position must be provided for every tooth on the stopper gear to facilitate an indefinite amount of actuation cycles.

In addition to resetting the geared disc relative to the terminating stopper gear and relative to the viewing window (40), it is also conceivable to alter the rotational position of the terminating stopper gear (39) relative to the viewing window (40). Assuming a single index on the geared disc viewed through the window as the starting point (e.g., the numeric index "0"), this would alter the number of incremental actuations that the geared disc can experience before reaching the terminal interface, thereby allowing users to adjust the terminal index at will. Though not shown in the disclosed views, such a design is straightforward to visualize, and would be implemented using the same type of biased revolute joint described and shown herein. The biased positions of the terminating stopper gear would need to be offset to the biased positions of the non-terminating stopper gear such that the correct optimal rotational offset between the stopper gear teeth sets is encouraged.

It is logical to question why the geared disc from Embodiments 2 and 3 cannot also be fitted with a single tooth only, on each of its planar faces, in order to reduce complexity and material requirements. This is indeed possible, though it is beneficial to maintain as much symmetry in the geared disc about its center of mass as possible. This mitigates the risk of the eccentric mass influencing the movement of the geared disc, such as an unwanted rotation induced by gravity resulting from a moment imbalance when the device is tilted. Additionally, a larger number of teeth distribute the contact forces between the geared disc and the stopper gear to a greater extent, making the interaction less sensitive to flaws in each individual tooth (though increasing the number of teeth involved), and reducing the wear rate of each tooth. When determining the optimal design, the need for symmetry of the geared disc and the sensitivity to individual tooth defects and wear should be considered with regard to the sensitivity and wear required for and inherent to the application, the manufacturing capability, and the potential cost savings.

Notes on Configuration Options

The restoring force incorporating Embodiment 3, the non-reciprocating Embodiment 4, and the manual reset revolute joint herein featured in both embodiments represent independent configuration options, and can be combined together or omitted in any combination, provided that a non-reciprocating embodiment also incorporates a manual reset means.

Referring to the disclosed cylindrical Embodiments 2, 3, and 4; the stopper gears that are not integral to the housing (and the optional lid for the threaded housing of Embodiment 3) can be fitted with ring gaskets (not shown) to ensure a water-tight seal. The viewing windows can be simple rectangular cutouts in the housing cylinder when matter ingress is not a concern.

Alternatively, a separate, transparent window part (not shown) could be seated in a cavity created in the housing (not shown) and attached with adhesive to seal the assembly.

Additionally, the housing cylinder could be composed of transparent material and a reference point marked with paint, for example, to serve the purpose of a viewing window. In the disclosed embodiments, recesses (49) on the geared disc, having the effect of engravings, form indices that serve as the visual indicating features of the geared disc. Alternative methods for creating visual indicating features on the central gear include laser etching and paint.

The invention claimed is:

1. A machine capable of generating relative motion of a central element in a direction perpendicular to input forces, said input forces being contact or non-contact type forces, said input forces oriented along a particular axis, said machine comprising:

said central element, which translates along said axis in a void disposed between a stopping means 1 and a stopping means 2;

said stopping means 1, whose geometry, at the initial points of interface with the central element, imposes initial support forces on said central element when a first stage input force aligned with said axis compels together the central element and the stopping means 1, a vector component of the net resulting force of said stopping means 1 initial support forces on the central element acting in a direction to encourage a first stage finite intended motion of the central element by translation or rotation in a direction perpendicular to the direction of said first stage input force, after which said first stage finite intended motion of the central element the geometry, interfaces, and forces of the stopping means 1 and the central element are no longer described as initial and the geometry of the stopping means 1 at the post-initial points of interface with the central element is designed such that a vector component of the net resulting force of the post-initial support forces of the stopping means 1 on the central element acts in a direction to oppose any further motion of the central element relative to the stopping means 1;

said stopping means 2, whose geometry, at the initial points of interface with the central element, imposes initial support forces on said central element when a second stage input force compels together the central element and the stopping means 2, a vector component of the net resulting force of said stopping means 2 initial support forces on the central element acting in a direction to encourage a second stage finite intended motion of the central element by translation or rotation in a direction identical to the direction of the rotation or translation which resulted from said first stage finite intended motion, after which said second stage finite intended motion of the central element the geometry, interfaces, and forces of the stopping means 2 and the central element are no longer described as initial and the geometry of the stopping means 2 at the post-initial points of interface with the central element is designed such that a vector component of the net resulting force of the post-initial support forces of the stopping means 2 on the central element acts in a direction to oppose any further motion of the central element relative to the stopping means 2;

a structural means to constrain the stopping means 1, the stopping means 2, and the central element such that said void is disposed which allows the central element to translate along said axis between said stopping means and to perform said intended stage 1 and stage 2 motions, and such that the positioning of the interface between the stopping means 1 and the central element relative to the interface between the stopping means 2 and the central element introduces an offset, said offset dictating that when the geometry of the central element is interlocked with the geometry of the stopping means 1 to the maximum extent permitted by the design and encouraged by the stopping means 1 support forces in the presence of a force along said axis compelling together the central element and the stopping means 1, the central element and the stopping means 2 are relatively oriented such that a subsequent force solely along said axis and compelling together the central element and the stopping means 2 would encourage a rotation or translation of the central element in said direction of intended motion before the central element becomes interlocked with the stopping means 2 to the maximum extent permitted by the design.

2. A machine in accordance with claim 1, further comprising:
  visual indicating features on said central element for identifying locations on the geometry of said central element;
  a means disposed in said structural means for viewing said visual indicating features and establishing a reference point from which the position of the central element relative to the structural means can be understood by the position of the visual indicating features relative to the reference point.

3. A machine in accordance with claim 2, further comprising:
  said central element configured as an inertial disc mass featuring one or more teeth on its planar faces
  said structural means configured as a cylindrical housing to enclose said inertial disc mass with the axis of said housing coincident with the axis of said inertial disc mass, said housing incorporating a viewing reference point from which rotation of said inertial disc mass relative to said housing can be understood by the presence of said visual indicating features upon said inertial disc mass;
  said stopping means 1 positioned at one end of the housing to constrain said void, and featuring one or more teeth which interface with the inertial disc mass;
  said stopping means 2 positioned at the opposing end of said housing to constrain said void, and featuring one or more teeth which interlock with the inertial disc mass, the teeth of both the stopping means being designed such that their geometry imparts a force that acts to rotate said disc mass in the presence of an axial force compelling together the inertial disc mass and either of the stopping means, and such that the direction of said rotation induced by each stopping means is the same, and such that a relative rotational offset is designed in the positioning of the four sets of said teeth so that when the teeth on one face of said inertial disc mass are interlocked with the stopping means 1 to the maximum extent permitted by the design, the teeth on the opposing face of said inertial disc mass are rotationally misaligned with the teeth on the stopping means 2, relative to the rotational position in which the teeth on said opposing face of the inertial disc mass are interlocked with the teeth of the stopping means 2 to the maximum extent permitted by the design.

4. A machine in accordance with claim 3, further comprising:
  said stopping means 1 configured as integral to said housing
  said stopping means 2 configured as a lid to said housing.

5. A machine in accordance with claim 3, further comprising
  an obstructing means to prevent further incremental advance of said inertial disc mass in said direction of indented motion when the inertial disc mass has reached an intended terminal position relative to the direction of intended motion, but otherwise permitting incremental advance of the central element in the direction of intended motion
  a reset means to facilitate manual adjustment of the position of said inertial disc mass relative to said obstructing means and to said viewing reference point in the direction of intended motion.

6. A machine in accordance with claim 3, further comprising:
  a resilient means which provides a restoring force along said input force axis to said central element to either augment or preclude said second stage input force
  a means for joining said resilient means to the central element that limits said translation of the central element along said input force axis by transferring the restoring force imposed by the resilient means, but does not prevent rotation of the central element in said direction of intended motion.

7. A machine in accordance with claim 6, further comprising:
  a means for attaching said resilient means to said central element that allows adjustment of the minimum tension or compression in the resilient means.

8. A machine in accordance with claim 7, further comprising:
  a means providing a reference point from which to gauge the static length of said resilient means.

* * * * *